US006953031B2

(12) United States Patent
Ishihara

(10) Patent No.: US 6,953,031 B2
(45) Date of Patent: Oct. 11, 2005

(54) EGR SENSOR WITH DRAINAGE MECHANISM

(75) Inventor: Kanji Ishihara, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 10/891,686

(22) Filed: Jul. 14, 2004

(65) Prior Publication Data

US 2005/0029479 A1 Feb. 10, 2005

(30) Foreign Application Priority Data

Aug. 8, 2003 (JP) ....................................... 2003-290949

(51) Int. Cl.[7] ........................ H01C 10/38; F02M 25/07; F16K 31/02

(52) U.S. Cl. ............................ 123/568.21; 251/129.15; 338/153; 338/176

(58) Field of Search ....................... 123/568.16, 568.21; 251/129.15; 73/116, 117.3, 118.1; 338/118, 153, 160, 162, 167, 176, 184, 194, 199

(56) References Cited

U.S. PATENT DOCUMENTS 5,095,299 A * 3/1992 Wakamatsu ................. 338/167
5,345,215 A * 9/1994 Okumura et al. ........... 338/176
6,034,590 A * 3/2000 Ishihara ...................... 338/176
6,051,897 A * 4/2000 Wissler et al. ............. 338/176
6,204,749 B1 * 3/2001 Ishihara ...................... 338/176
6,417,759 B2 7/2002 Ishihara ...................... 338/176
2003/0214382 A1 * 11/2003 Tsuchida .................... 338/162

* cited by examiner

*Primary Examiner*—Willis R. Wolfe, Jr.
(74) *Attorney, Agent, or Firm*—Beyer Weaver & Thomas, LLP

(57) ABSTRACT

The present invention provides an EGR sensor capable of stably holding the actuating shaft of a product without increasing the length of the actuating shaft in the longitudinal direction and shorting the movable range of the actuating shaft, and capable of preventing water stagnated in the EGR sensor from affecting contacting portions of the conductive parts. The EGR sensor comprises a substrate having a slider and a plurality of external lead-out terminals and electrodes, a bearing having an actuating shaft passing there through, and a casing having a receiving portion for receiving the substrate and the slider. A communicating passage comprising a groove or a hole is provided at the side of the bearing. The communicating passage leads to the insertion hole from the inside of the receiving portion. The moisture stagnated in the receiving portion is drained through the communicating passage to the outside.

6 Claims, 4 Drawing Sheets

EGR SENSOR WITH DRAINAGE MECHANISM

BACKGROUND OF THE INVENTION

1. Field of the Invention

The present invention relates to an EGR sensor for controlling the recycled amount of an exhaust-gas of a motor vehicle.

2. Description of the Related Art

In a conventional EGR sensor, when an actuating shaft is pressed by a rod of a solenoid which drives an EGR valve of a motor vehicle, a movable member engaged with the actuating shaft moves axially, so that a slider held by the movable member is brought into sliding contact with a resistor provided on a substrate. At this time, a resistance value of the resistor changes to detect the distance of the movement of the actuating shaft (for example, refer to Japanese Unexamined Patent Application Publication No. 2002-21648).

The structure of a conventional EGR sensor will now be described with reference to a drawing. FIG. 6 is a sectional view of the conventional EGR sensor as seen from the side.

In the drawing, a case 101 has a receiving portion 101*a* with its one side open. An insulating substrate 103 having a resistor 102 provided thereon is received within the receiving portion 101*a* of the case 101 and is pressed with a spring 104 from the bottom. Further, the resistor 102 is connected to a connector pin 105 with a connecting clip 106. A cover 107 has a flat-plate-shaped base 107*a*, and a cylindrical bearing 107*c* having a hole 107*b* at its center. The cover is mounted on the case 101 so as to cover the opening portion of the case 101. An actuating shaft 108 has a columnar shank 108*a*, and a protrusion 108*c* extending straight, axially and rearward from the shank 108*a*. The shank 108*a* is inserted into the hole 107*b* of the cover 107, and the protrusion 108*c* is latched to the rear end of the bearing 107*c*.

A slider 110 is attached to the bottom of a movable member 109, and the slider 110 is attached to the case 101 so as to be slidable in the receiving portion 101*a*while it is brought in contact with the resistor 102. Detecting means comprises a variable resistor composed of the resistor 102 and the slider 110. A coil spring 111 is located in the receiving portion 101*a* such that its one end abuts on the rear wall 101*c* of the case 101 and its other end abuts on the spring receiving portion 109*c*of the movable member 109. The movable member 109 is forwardly urged together with the actuating shaft 108.

In the EGR sensor, when the actuating shaft 108 is pressed against a biasing force of the coil spring 111 by a rod of a solenoid, which drives an EGR valve of a motor vehicle, the movable member 109 is axially and linearly moved by the actuating shaft 108. Then, the slider 110 moves on the resistor 102. As a result, a resistance value of the resistor detected by detecting means changes so that the distance of movement of the actuating shaft 108 is detected.

Further, when the rod is released from pressing the actuating shaft 108, the movable member 109 is pushed back by the coil spring 111, and returned to its initial state.

Sufficient airtightness is required for an EGR sensor for a motor vehicle. However, since a shaft and a bearing slide relative to each other, there is a probability that a gap is formed between the shaft and the bearing, the moisture contained in an exhaust-gas enters the EGR sensor through the gap, and is then liquefied therein, and the resulting water is stagnated in a hollow part formed by the bearing and the case. There is also a problem in that a contacting portion between a clip terminal and a substrate, or a contacting portion between the clip terminal and other terminal may corrode, which damages the reliability of contact therebetween, and short-circuiting may occur between electrodes due to the water.

The above problems can be solved by arranging the bearing and the end of substrate such that they do not overlap each other in their longitudinal direction, or by causing the bearing part to protrude outwardly. However, another problems occur in that the length of a product may increase and the movable range of the actuating shaft may become short.

Accordingly, the present invention is designed to resolve above problems, and it is an object of the present invention to provide an EGR sensor capable of stably holding an actuating shaft of a product without increasing the length of the actuating shaft in its longitudinal direction and shortening the movable range of the actuating shaft, and capable of preventing the water stagnated in the EGR sensor from affecting contacting portions of conductive parts, such as electrodes or terminals.

In order to solve the above problems, as first means, the present invention provides an EGR sensor comprising: a linearly and axially movable actuating shaft, a slider driven by the actuating shaft, a substrate having a plurality of external lead-out terminals and electrode and having a slider slidable thereon, and a casing having an insertion hole through which the actuating shaft passes provided therein and having a bearing for guiding the movement of the actuating shaft and a receiving portion for receiving the substrate and the slider. When the casing is attached, the bearing is located downwardly. A communicating passage comprising a groove or a hole is provided at the side of the bearing, the communicating passage being located lower than a position where the external lead-out terminals or electrodes of the substrate received in the receiving portion are attached, and the communicating passage leading to the insertion hole from the inside of the receiving portion. The moisture stagnated in the receiving portion is drained through the communicating passage to the outside.

Further, as second means, the communicating passage is formed in a direction orthogonal to the axial direction of the actuating shaft in the bearing.

Further, as third means, the communicating passage is formed in the axial direction of the actuating shaft in the bearing.

Further, as fourth means, a plurality of the communicating passages is formed in the circumferential direction of the bearing.

Further, as fifth means, the present invention provides an EGR sensor comprises a linearly and axially movable actuating shaft, a slider driven by the actuating shaft, a substrate having a plurality of external lead-out terminals and an electrode and having a slider slidable thereon, and a casing having an insertion hole through which the actuating shaft passes provided therein and having a bearing for guiding the movement of the actuating shaft and a receiving portion for receiving the substrate and the slider. When the casing is attached, the bearing is located downwardly. A communicating passage comprising an axially extending groove is formed at the side of the actuating shaft. At a first actuating position of the actuating shaft, the communicating passage directly connects the receiving portion with the outside, so that the moisture stagnated in the receiving portion is drained through the communicating passage to the outside. At a second actuating position of the actuating shaft, the communicating passage does not directly connect the receiving portion to the outside.

Further, as the sixth means, when an engine stops and a valve closes, the actuating shaft is at the first actuating position, and when the engine is driven and the valve is operated, the actuating shaft is at the second actuating position.

As described above, an EGR sensor of the present invention comprises a linearly and axially movable actuating shaft, a slider driven by the actuating shaft, a substrate having a plurality of external lead-out terminals and electrode and having a slider slidable thereon, and a casing having an insertion hole through which the actuating shaft passes provided therein and having a bearing for guiding the movement of the actuating shaft and a receiving portion for receiving the substrate and the slider. When the casing is attached, the bearing is located downwardly. A communicating passage comprising an axially extending groove is formed at the side of the actuating shaft. At a first actuating position of the actuating shaft, the communicating passage directly connects the receiving portion with the outside, so that the moisture stagnated in the receiving portion is drained through the communicating passage to the outside. At a second actuating position of the actuating shaft, the communicating passage does not directly connect the receiving portion with the outside. Thus, the water stagnated in the EGR sensor is located lower than the external lead-out terminals or electrodes of the substrate and is drained through the communicating passage to the outside. As a result, the contacting portions can be prevented from corroding or short-circuiting without causing immersion of the external terminals or electrodes in the water.

Further, since the length of a bearing surface for receiving the actuating shaft of the bearing portion remains unchanged, the actuating shaft can be firmly held therein.

Further, the communicating passage is formed in a direction orthogonal to the axial direction of the actuating shaft in the bearing. Thus, a communicating passage is blocked by the actuating shaft at the side of the bearing. As a result, a large amount of the moisture included in an exhaust-gas does not enter the EGR sensor.

Further, the communicating passage is formed in the axial direction of the actuating shaft in the bearing. Thus, the moisture stagnated in the EGR sensor can be drained along the actuating shaft. As a result, the moisture can be surely drained to the outside.

Further, a plurality of the communicating passages is formed in the circumferential direction of the bearing. Thus, the rate at which the water is drained to the outside is rapidly performed. As a result, the level of water in the EGR sensor can be rapidly lowered and the actuating shaft can be surely held in the bearing.

Further, an EGR sensor of the present invention comprises a linearly and axially movable actuating shaft, a slider driven by the actuating shaft, a substrate having a plurality of external lead-out terminals and electrode and having a slider slidable thereon, and a casing having an insertion hole through which the actuating shaft passes provided therein and having a bearing for guiding the movement of the actuating shaft and a receiving portion for receiving the substrate and the slider. When the casing is attached, the bearing is located downwardly. A communicating passage comprising an axially extending groove is formed at the side of the actuating shaft. At a first actuating position of the actuating shaft, the communicating passage directly connects the receiving portion with the outside, so that the moisture stagnated in the receiving portion is drained through the communicating passage to the outside. At a second actuating position of the actuating shaft, the communicating passage does not directly connect the receiving portion with the outside. At the first actuating position, the water stagnated in the EGR sensor is drained through the communicating passage to the outside. Thus, the contacting portions can be prevented from corroding or short-circuiting without causing immersion of the external lead-out terminals or electrodes in the water. At the second actuating position, moisture can be refrained from entering the EGR sensor.

Further, when an engine stops and a valve closes, the actuating shaft is at the first actuating position, and when the engine is driven and the valve is operated, the actuating shaft is at the second actuating position. Thus, at the time of the operation of the valve when it is easy for water to enter the receiving portion, the communicating passage does not communicate with the inside or outside, and, at the time of closing of the valve when it is difficult for water to enter the receiving portion, the communicating passage communicates with the inside or outside. As a result, the moisture stagnated in the EGR sensor can be surely drained to the outside while the moisture in an exhaust-gas can be efficiently refrained from entering the EGR sensor.

DESCRIPTION OF THE PREFERRED EMBODIMENTS

Figure 1:
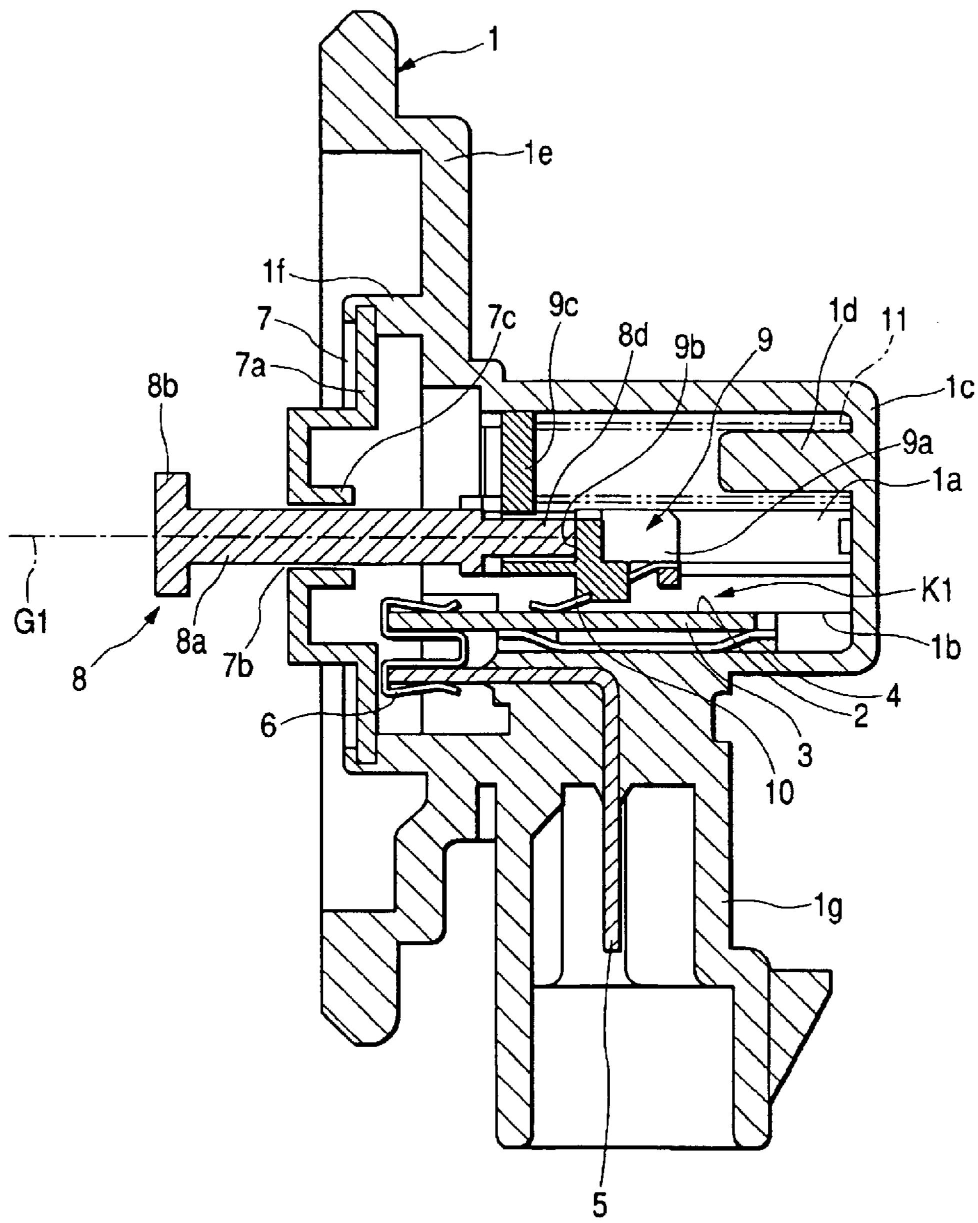
FIG. 1 is a sectional view illustrating an EGR sensor according to the present invention.
Figure 2:
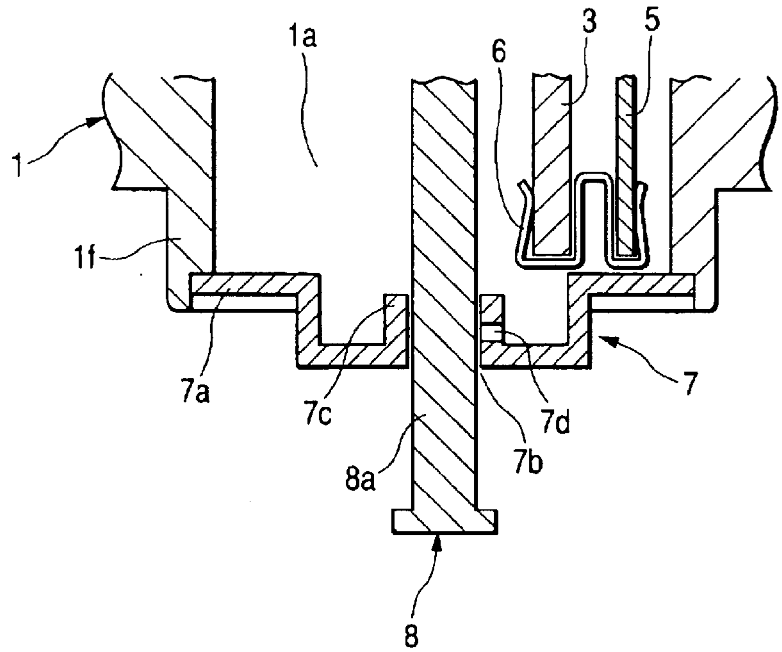
FIG. 2 is a sectional view of essential parts illustrating the EGR sensor according to the present invention.
Figure 3:
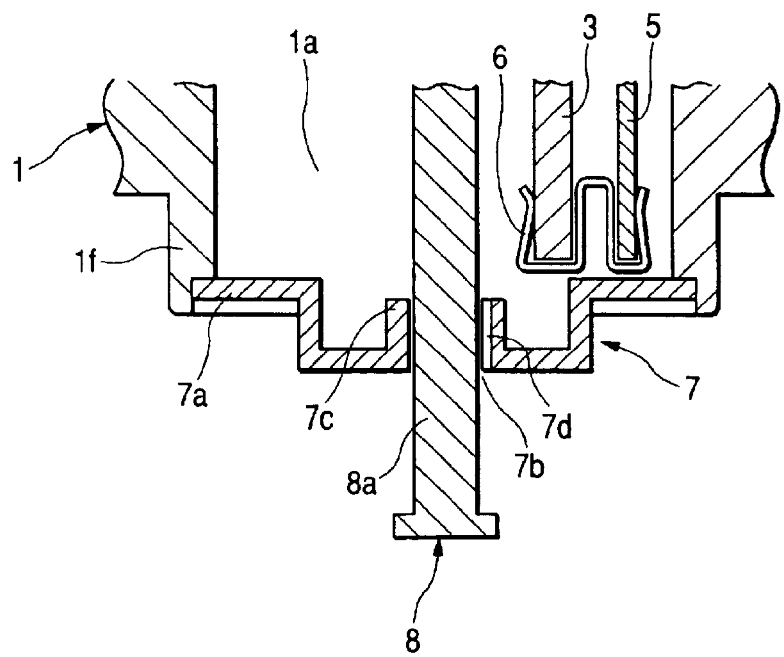
FIG. 3 is a sectional view of essential parts illustrating of an EGR sensor according to another embodiment of the present invention.
Figure 4:
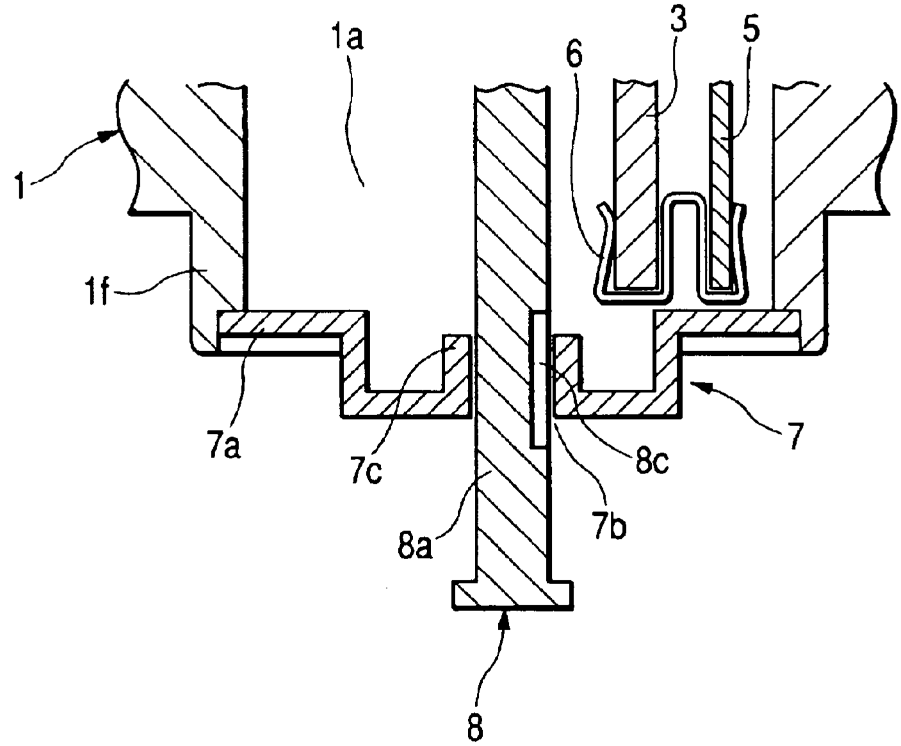
FIG. 4 is a sectional view of essential parts illustrating a first actuating state of an actuating shaft according to still another embodiment of the present invention.
Figure 5:
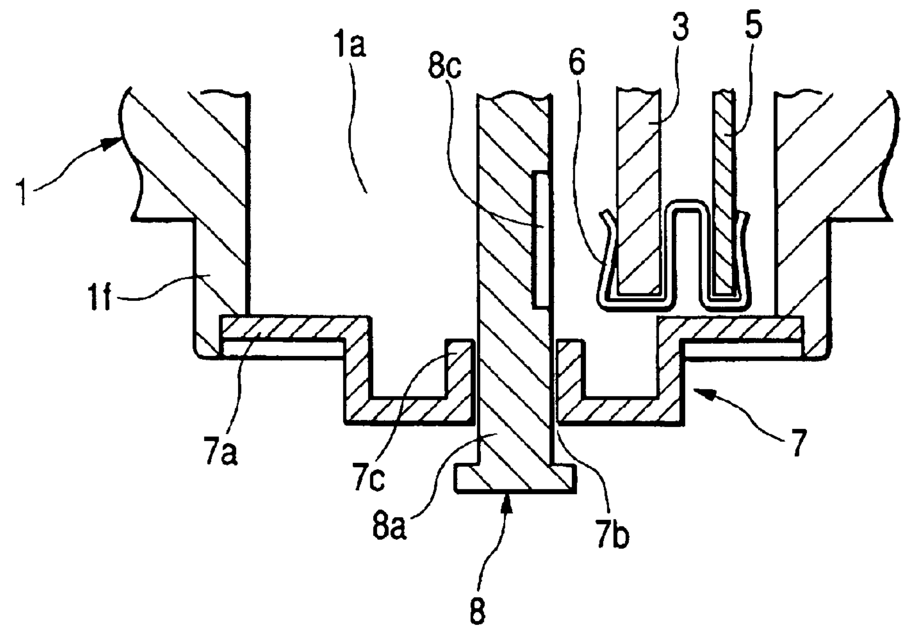
FIG. 5 is a sectional view of essential parts illustrating a second actuating state of the actuating shaft in FIG. 4 according to the present invention.
Figure 6:
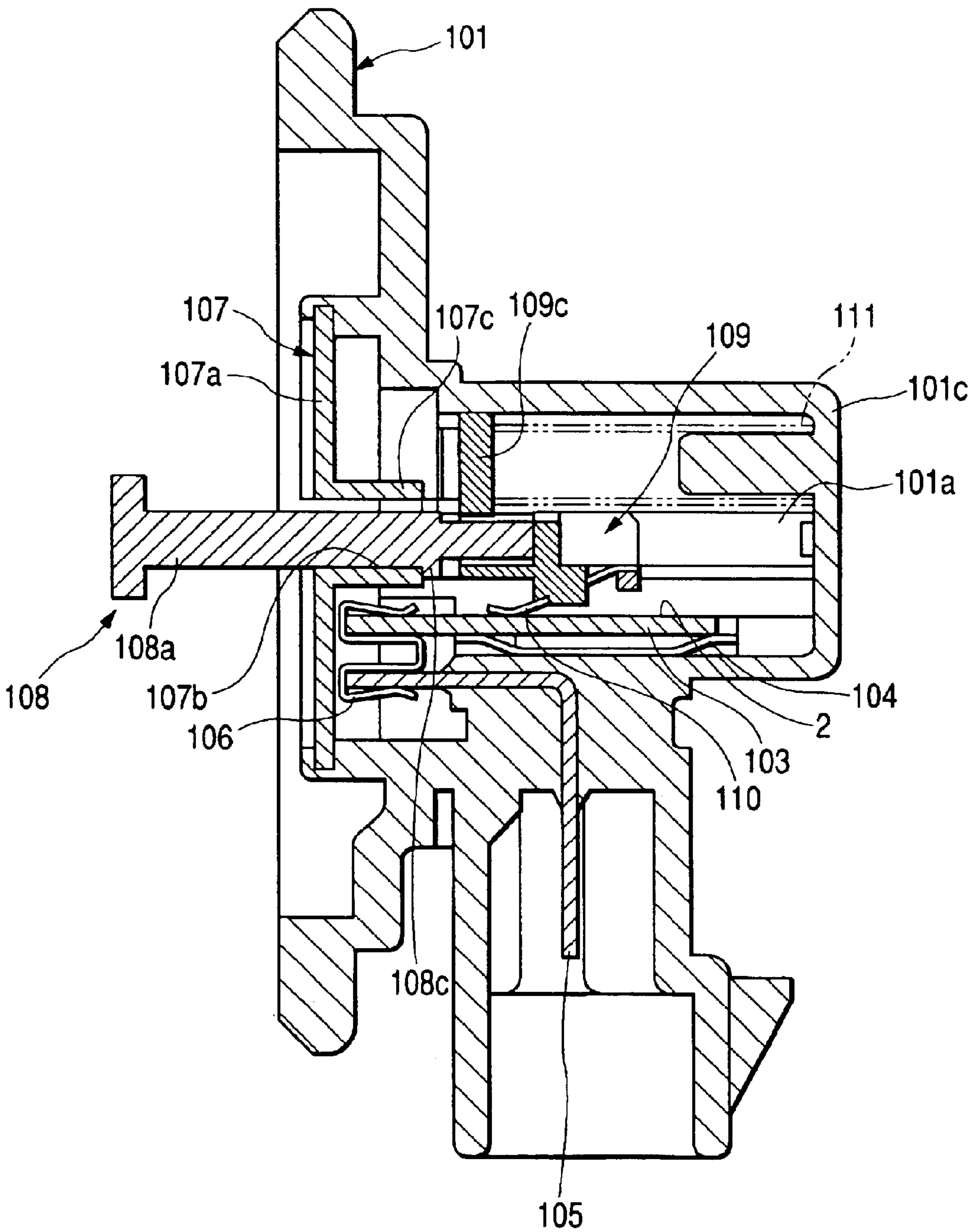
FIG. 6 is a sectional view illustrating a conventional EGR sensor.

Hereinafter, an EGR sensor according to embodiments of the present invention will be described in detail with reference to FIGS. 1 to 5. FIG. 1 is a sectional view of an EGR sensor according to an embodiment of the present invention. FIG. 2 is a sectional view of essential parts showing the EGR sensor according to the embodiment of the present invention. FIG. 3 is a sectional view of essential parts of an EGR sensor according to another embodiment of the present invention. FIGS. 4 and 5 are sectional views of essential parts of an EGR sensor according to still another embodiment of the present invention, FIG. 4 shows a first actuating position of an actuating shaft and FIG. 5 shows a second actuating position of the actuating shaft.

In FIGS. 1 and 2, a case 1 made of synthetic resin moldings comprises a hollow receiving portion 1*a* whose one end is opened, a pair of recessed shoulders 1*b* which extends forward and backward in the receiving portion 1*a*, a protrusion 1*d* which is located in the receiving portion 1*a* and extends from a rear wall 1*c*, a tubular mounting portion 1*f* provided on a front wall 1*e*, and a cylindrical portion 1*g* protruding at a right angle to the receiving portion 1*a*.

A substrate 3 on which a resistor 2 is provided is inserted into the pair of shoulders 1*b* of the case 1, is located in the receiving portion 1*a*, is pressed by a spring 4 from the bottom side, is pressed against the shoulders 1*b*, and is attached in the receiving portion 1*a*. In addition, in the resistor 2 which is provided on the substrate 3, an electrode is electrically connected to one end of an L-shaped connector pin 5 buried in the case 1 through a connection clip 6. The connector pin 5 and a connection clip 6 serve as an external lead-out terminal.

A cover 7 made of synthetic resin molding comprises a base 7*a* having a circular flat-plate shape, a circular insertion hole 7*b* formed so as to protrude outward at the center of the base 7*a*, and a tubular bearing 7*c* extending toward the inside of the receiving portion 1*a*. In addition, the cover 7 is attached to the mounting portion 1*f* of the case 1 by use of a caulking so as to cover an opening portion of the case 1. In addition, the cover 7 and the case 1 form a casing having the receiving portion 1*a* formed therein.

In addition, as shown in FIG. 2, at the side of the bearing 7*c*, a communicating passage 7*d*, comprising a groove and a hole, which leads to the insertion hole 7*b* from the inside of the receiving portion 1*a* is provided. In addition, the communicating passage 7*d* is formed in a direction orthogonal to an axial direction G1 of the actuating shaft 8 at the bottom side of the bearing 7*c*. In this case, when the case 1 is attached to an EGR valve device, the bearing 7*c* is located in a downward side. The communicating passage 7*d* is located lower than the pin 5, the connecting clip 6, or an installation position of an electrode which serve as the external lead-out terminal connected to the electrode of the substrate 3 received in the receiving portion 1*a*. In addition, moisture stagnated in the receiving portion 1*a* can be drained to the outside through the communicating passage 7*d*.

Further, in this case, at least one communicating passage 7*d* may be provided. However, a plurality of communicating passages 7*d* may be provided in the circumferential direction of the bearing 7*c*. When adopting this configuration, the rate of water drained outside increases so that it is possible to promote a decrease in the water level. In addition, since a shank 8*a* of the actuating shaft 8 can be received at the entire circumference of the bearing 7*c*, it is possible to surely hold the actuating shaft 8.

The actuating shaft 8 comprises a cylindrical shank 8*a*, an oval flange 8*b* provided at a front end of the shank 8*a*, and a small diameter portion 8*d* which protrudes in an axial direction G1 from a rear end of the shank 8*a*. In addition, when the actuating shaft 8 is assembled into the cover 7, the actuating shaft 8 is located in front of the cover 7, and the actuating shaft 8 is inserted into the insertion hole 7*b* from the rear side with the shank 8*a* fitted into the insertion hole 7*b*. And then, by using a fitting member (not shown), the actuating shaft 8 is fitted into the case 1 so as to be movable in the axial direction G1.

A movable member 9 made of synthetic resin molding comprises a base 9*a*, a recess 9*b* provided at the center portion of the base 9*a*, and a spring receiving portion 9*c* extending upward from the base 9*a*. In addition, a slider 10 composed of a metal plate is attached to a lower portion of the movable member 9. In addition, the movable member 9 to which the slider 10 is attached is attached to the case 1 so as to be movable linearly in the receiving portion 1*a*, in a state that the slider 10 contacts the resistor 2. In addition, although not shown here, when the movable member 9 is moved, it is guided by a guide portion attached to the case 1. In addition, a detecting means K1 is comprised of the resistor 2 and the slider 10.

The coil spring 11 is located in the receiving portion 1*a*, the protrusion 1*d* of the case 1 is fitted into the center portion thereof such that one end thereof contacts the rear wall 1*c*, and the end thereof contacts the spring receiving portion 9*c* of the movable member 9. In addition, when the actuating shaft 8 is assembled into the movable member 9, as shown in FIG. 1, the small diameter portion 8*d* is located in the recess 9*b* of the movable member 9. In addition, the movable member 9 is biased forward by the coil spring 11, and then the movable member 9 is in contact with the small diameter portion 8*d* of the actuating shaft 8. In addition, the actuating shaft 8 is pressed by the coil spring 11 and then the fitting portion (not shown) abuts on the case 1.

Next, an assembling method of the EGR sensor having such a configuration will be now described. First, after the substrate 3 is attached to a receiving portion 1*a* of the case 1, a connection clip 6 is interposed between the electrode of the resistor 2 of the substrate 3 and the connector pin 5. Then, after the coil spring 11 is inserted into the concave portion 1*d* of the case 1, the movable member 9 to which the slider 10 is attached is fitted into the guide portion of the receiving portion 1*a* of the case 1 and after the small diameter portion 8*d* of the actuating shaft 8 engages with the recess 9*b* of the movable member 9, the cover 7 through which the actuating shaft 8 passes is attached to the case 1 using a caulking.

The EGR sensor according to the present invention having a configuration described above is combined with a solenoid by a set maker. The solenoid comprises a metallic cover, a hollow coil provided in the cover, a rod, made from an iron core, provided in the center of the coil and connected to the EGR valve. The cover is attached to the front wall 1*e* of the case 1 of the EGR sensor and thus the solenoid is combined with the EGR sensor.

Next, the operation of the EGR sensor of the present invention will be now described. When the actuating shaft 8 is pressed against the coil spring 11 by the rod of the solenoid for driving an EGR valve of an auto vehicle, by the actuating shaft 8, the movable member 9 guides the guide portion and moves linearly in the axial direction G1. If so, the slider 10 moves on the resistor 2. As a result, a resistance value is varied by the detecting means K1, and the distance of movement of the actuating shaft 8 is detected. In the present embodiment, when the EGR valve is actuated, the insertion position of the actuating shaft 8 is used as the second actuating position.

In addition, when the pressing of the actuating shaft 8 by the rod is released, the movable member 9 is pushed back by the coil spring 11, and the actuating shaft 8 is pushed back to an original state by the movable member 9 and thus is returned to an initial state. A position at the actuating shaft 8 is pushed back when the EGR valve is closed is used as a first actuating position. In this manner, the operation of the EGR sensor of the present invention is performed.

In the configuration according to the embodiment described above, at the side of the bearing 7*c*, the communicating passage 7*d* which is located lower than the connector pin 5, the connecting clip 6, or an installation position of an electrode which serve as the external lead-out terminal of the substrate 3 received in the receiving portion 1*a* and which is formed of a groove and a hole, which leads to the insertion hole 7b from the inside of a receiving portion 1a is provided. In addition, moisture stagnated in the receiving portion 1a can be drained outside through the communicating passage 7d to the outside. Accordingly, water stagnated in the receiving portion 1a is located lower than the external lead-out terminal connected to the electrode of the substrate 3 and is drained outside through the communicating passage 7d. As a result, the external lead-out terminal or the electrode is not immersed in the water and then it is possible to prevent a contacting portion from corroding and short-circuiting. In addition, since the length of a receiving surface of the bearing 7c for receiving the actuating shaft 8 can be maintained, it is possible to surely hold the actuating shaft 8.

In addition, the communicating passage 7d is formed in a direction orthogonal to an axial direction G1 of the actuating shaft 8 in the bearing 7c, and then the communicating passage 7d is closed by the actuating shaft 8 at the side of the bearing 7c. Accordingly, it is possible to prevent a large amount of moisture contained in an exhaust gas from enter the sensor.

In addition, in the embodiment, the detecting means K1 is described using a variable resistor composed of the resistor 2 and the slider 10. However, the detecting means K1 may be composed of a detecting member such as a magnet and a hole IC.

FIG. 3 shows another embodiment of the present invention. In the present embodiment, the configuration of the communicating passage 7d of the insertion hole 7b provided in the bearing 7c of the cover 7 is different from that of the above embodiment. That is, in FIG. 3, the communicating passage 7d is formed in the axial direction G1 of the actuating shaft 8 in the bearing 7c. As such, since the communicating passage 7d is formed in the axial direction G1 of the actuating shaft 8 in the bearing 7c, moisture stagnated in the inner portion of the sensor can be drained along the actuating shaft 8, and thus it is possible to surely discharge the moisture to the outside.

In addition, when a plurality of the communicating passage 7d is formed in the circumferential direction of the bearing 7c, the rate of water drained to the outside increases so that it is possible to rapidly decrease the level of water. In addition, since a shank 8a of the actuating shaft 8 can be received in an entire circumference of the bearing 7c, it is possible to surely hold the actuating shaft 8.

FIGS. 4 and 5 illustrate still another embodiment. In this case, a communicating passage for discharging moisture to the outside is not formed at the side of a bearing 7c and a communicating passage 8c comprising a groove extending in an axial direction G1 of the side of the actuating shaft is formed.

In addition, as shown in FIG. 4, when the actuating shaft 8 is pushed back to an initial state by the coil spring 11, the communicating passage 8c is directly connected to the inside and outside of the receiving portion 1a. This state becomes the first actuating position of the actuating shaft 8. The first actuating position is the case that the engine stops and the EGR valve is closed. At the first actuating position of the actuating shaft 8, the communicating passage 8c communicates directly with the inside and outside of the receiving portion 1a. The moisture stagnated in the receiving portion 1a can be drained outside through the communicating passage 8c.

In addition, as shown in FIG. 5, when the actuating shaft 8 is pressed against a biasing force of the coil spring 11 by a rod of a solenoid, which drives an EGR valve of a motor vehicle, the actuating shaft 8 moves linearly in the axial direction G1, the communicating passage 8c moves in the receiving portion 1a and is received in the receiving portion 1a. This state becomes the second actuating position of the actuating shaft 8. The second actuating position is the case that the engine drives and the EGR valve is actuated. At the second actuating position of the actuating shaft 8, the communicating passage 8c does not communicate directly with the inside and outside of the receiving portion 1a.

As such, a communicating passage 8c comprising a groove extending in the axial direction G1 is formed at the side of the actuating shaft 8. At a first actuating position of the actuating shaft 8, the communicating passage 8c directly connects the receiving portion 1a with the outside, so that the moisture stagnated in the receiving portion 1a is drained through the communicating passage 8c to the outside. At a second actuating position of the actuating shaft 8, the communicating passage 8c does not directly connect the receiving portion 1a with the outside. As a result, at the first actuating position, water stagnated in the receiving portion is drained through the communicating passage 8c to the outside and then the external lead-out terminal connected to the electrode of the substrate 3 and the electrode is not immersed in water. In addition, it is possible to prevent a contacting portion from corroding and being short-circuited. In addition, at the second actuating position, it is possible to prevent moisture from infiltrating from outside.

Further, at the first actuating position, an engine stops and the EGR valve closes, and at the second actuating position, the engine is driven and the EGR valve is operated. Thus, at the time of the operation of the valve when it is easy for water to enter the receiving portion 1a, the communicating passage 8c does not communicate with the inside or outside, and, at the time of closing of the valve when it is difficult for water to enter the receiving portion 1a, the communicating passage 8c communicates with the inside or outside. As a result, the moisture stagnated in the EGR sensor can be surely drained to the outside while the moisture in an exhaust-gas can be efficiently prevented from entering the EGR sensor.

What is claimed is:

1. An EGR sensor comprising:

a linearly and axially movable actuating shaft;

a slider driven by the actuating shaft;

a substrate having a plurality of external lead-out terminals and electrode and having a slider slidable thereon; and a casing having an insertion hole through which the actuating shaft passes provided therein and having a bearing for guiding the movement of the actuating shaft and a receiving portion for receiving the substrate and the slider, wherein, when the casing is attached, the bearing is located downwardly, wherein a communicating passage comprising a groove or a hole is provided at the side of the bearing, the communicating passage being located lower than a position where the external lead-out terminals or electrodes of the substrate received in the receiving portion are attached, and the communicating passage leading to the insertion hole from the inside of the receiving portion, and wherein the moisture stagnated in the receiving portion is drained through the communicating passage to the outside.

2. The EGR sensor according to claim 1, wherein the communicating passage is formed in a direction orthogonal to the axial direction of the actuating shaft in the bearing.

3. The EGR sensor according to claim 1, wherein the communicating passage is formed in the axial direction of the actuating shaft in the bearing.

4. The EGR sensor according to claim 1, wherein a plurality of the communicating passages is formed in the circumferential direction of the bearing.

5. An EGR sensor comprising:

a linearly and axially movable actuating shaft;

a slider driven by the actuating shaft;

a substrate having a plurality of external lead-out terminals and electrode and having a slider slidable thereon; and a casing having an insertion hole through which the actuating shaft passes provided therein and having a bearing for guiding the movement of the actuating shaft and a receiving portion for receiving the substrate and the slider, wherein, when the casing is attached, the bearing is located downwardly, wherein a communicating passage comprising an axially extending groove is formed at the side of the actuating shaft, wherein, at a first actuating position of the actuating shaft, the communicating passage directly connects the receiving portion with the outside, so that the moisture stagnated in the receiving portion is drained through the communicating passage to the outside, and wherein, at a second actuating position of the actuating shaft, the communicating passage does not directly connect the receiving portion with the outside.

6. The EGR sensor according to claim 5, wherein, when an engine stops and a valve closes, the actuating shaft is at the first actuating position, and wherein, when the engine is driven and the valve is operated, the actuating shaft is at the second actuating position.

* * * * *